United States Patent
Kobayashi et al.

(10) Patent No.: US 9,462,419 B2
(45) Date of Patent: Oct. 4, 2016

(54) HOLD STATE JUDGING APPARATUS AND COMPUTER READABLE MEDIUM

(71) Applicant: Asahi Kasei Kabushiki Kaisha, Tokyo (JP)

(72) Inventors: Shiro Kobayashi, Tokyo (JP); Yuko Akagi, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/829,733

(22) Filed: Aug. 19, 2015

(65) Prior Publication Data

US 2015/0358783 A1 Dec. 10, 2015

Related U.S. Application Data

(63) Continuation of application No. PCT/JP2014/000791, filed on Feb. 17, 2014.

(30) Foreign Application Priority Data

Feb. 22, 2013 (JP) .................................. 2013-033894

(51) Int. Cl.
| | |
|---|---|
| *H04M 1/00* | (2006.01) |
| *H04W 4/02* | (2009.01) |
| *G01C 21/16* | (2006.01) |
| *H04M 1/725* | (2006.01) |

(52) U.S. Cl.
CPC ............... *H04W 4/027* (2013.01); *G01C 21/16* (2013.01); *H04M 1/72569* (2013.01); *H04M 2250/12* (2013.01)

(58) Field of Classification Search
CPC ..................... H04M 2250/12; H04M 1/72572; H04M 1/72519; H04M 1/72569; H04W 4/027; H04W 64/00; G06F 3/0346; G06F 3/017; G01C 21/16; G01V 7/02

USPC ............... 702/150, 151; 455/418, 556, 456.1
See application file for complete search history.

(56) References Cited

U.S. PATENT DOCUMENTS

2007/0299626 A1* 12/2007 Song ..................... G01C 21/16
                                                        702/151
2010/0304757 A1    12/2010 Yoshioka
2011/0282620 A1    11/2011 Sakuraoka
2013/0179107 A1     7/2013 Setoguchi et al.

FOREIGN PATENT DOCUMENTS

| JP | 2010-78492 A | 4/2010 |
|---|---|---|
| JP | 2011-257374 A | 12/2011 |

(Continued)

OTHER PUBLICATIONS

Translation of the International Preliminary Report on Patentability dated Sep. 3, 2015 in corresponding PCT/JP2014/000791.

(Continued)

*Primary Examiner* — Olumide T Ajibade Akonai
(74) *Attorney, Agent, or Firm* — Morgan, Lewis & Bockius LLP

(57) ABSTRACT

In order to accurately determines the hold state of a mobile device possessed by a user while moving, provided is a hold state judging apparatus including an acquiring section that acquires output signals of sensors mounted in a mobile device held by a user; a pattern storage section that stores, in association with each other, information indicating a plurality of hold states of the mobile device and reference characteristic amounts of the output signals of the sensors obtained in advance respectively for the plurality of hold states; a hold state judging section that judges the hold state of the mobile device based on which of the reference characteristic amounts stored in the pattern storage section characteristic amounts of the output signals of the sensors acquired by the acquiring section correspond to. Also provided is a program.

26 Claims, 5 Drawing Sheets

(56) References Cited

FOREIGN PATENT DOCUMENTS

| | | |
|---|---|---|
| JP | 2012-099908 A | 5/2012 |
| WO | 2010/007765 A1 | 1/2010 |
| WO | 2011/083572 A1 | 7/2011 |

OTHER PUBLICATIONS

International Search Report and translation of same dated Apr. 28, 2014 in corresponding PCT/JP2014/000791.

* cited by examiner

HOLD STATE JUDGING APPARATUS AND COMPUTER READABLE MEDIUM

The contents of the following Japanese patent application are incorporated herein by reference:
No. JP2013-033894 filed on Feb. 22, 2013.

BACKGROUND

1. Technical Field

The present invention relates to a hold state judging apparatus and a program.

2. Related Art

Conventionally, when checking the hold state of a mobile device, for example, the hold state is identified by calculating the fluctuation amount of the average movement or the movement trajectory of the mobile device, based on speed information or a geomagnetic vector fluctuation amount detected by a sensor of the mobile device, as shown in Patent Documents 1 and 2, for example.
Patent Document 1: Japanese Patent Application Publication No. 2010-78492
Patent Document 2: International Publication WO 2010/007765

However, when identifying the mobile device hold state of a pedestrian using the method described in Patent Document 1, it is only possible to distinguish between broad hold states, specifically between a hold state in which the orientation of the mobile device fluctuates and a hold state in which the orientation of the mobile device does not fluctuate, and it is difficult to specifically identify the hold state. Furthermore, when identifying the mobile device hold state using the method described in Patent Document 2, it is difficult to isolate a signal detected in response to movement of the user possessing the mobile device from a signal detected in response to fluctuation in the hold state of the mobile device. Accordingly, it is difficult to accurately identify the hold state of the mobile device during natural movement of the user, such as when the user is walking.

SUMMARY

Therefore, it is an object of an aspect of the innovations herein to provide a hold state judging apparatus and a program, which are capable of overcoming the above drawbacks accompanying the related art. The above and other objects can be achieved by combinations described in the claims. According to a first aspect of the present invention, provided is a hold state judging apparatus including an acquiring section that acquires output signals of sensors mounted in a mobile device held by a user; a pattern storage section that stores, in association with each other, information indicating a plurality of hold states of the mobile device and reference characteristic amounts of the output signals of the sensors obtained in advance respectively for the plurality of hold states; a hold state judging section that judges the hold state of the mobile device based on which of the reference characteristic amounts stored in the pattern storage section characteristic amounts of the output signals of the sensors acquired by the acquiring section correspond to. Also provided is a program.

According to a second aspect of the present invention, provided is a hold state judging apparatus including an acquiring section that acquires output signals of sensors mounted in a mobile device and a hold state judging section that judges a hold state of the mobile device based on a relationship between two or more axial direction components among a plurality of axial direction components obtained when the output signals of the sensors are separated into the plurality of axial direction components. Also provided is a program.

According to a third aspect of the present invention, provided is a hold state judging apparatus including an acquiring section that acquires output signals of sensors mounted in a mobile device and a hold state judging section that judges a hold state of the mobile device based on the output signal accompanying the walking of the user. Also provided is a program.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
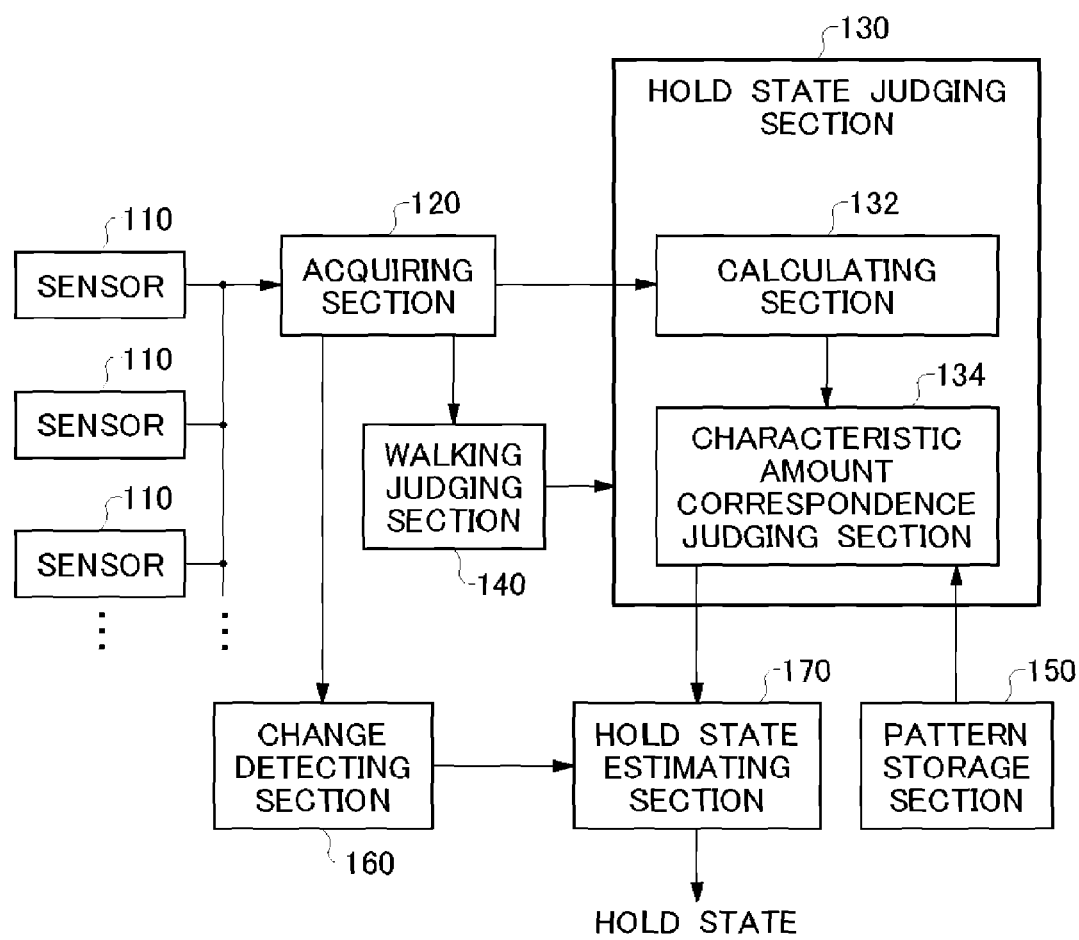
FIG. 1 shows an exemplary configuration of a hold state judging apparatus 100 according to an embodiment of the present invention.

FIG. 1 shows an exemplary configuration of a hold state judging apparatus 100 according to an embodiment of the present invention. The hold state judging apparatus 100 performs a judgment of a hold state of a mobile device and a detection concerning whether a user of the mobile device is walking, based on output of a sensor housed in the mobile device held by the user, and estimates the hold state of the user while walking.

The mobile device has a display function for displaying information and a data processing function for executing programs, for example. The user holds the mobile device and manipulates the mobile device while walking to execute a function for displaying information, for example. The mobile device is a smartphone, mobile phone, tablet PC (personal computer), mobile GPS device, or small-scale PC, for example. The hold state judging apparatus 100 includes a sensor 110, an acquiring section 120, a hold state judging section 130, a walking judging section 140, a pattern storage section 150, a change detecting section 160, and a hold state estimating section 170.

The sensor 110 is mounted in the mobile device. The sensor 110 may be any one of an acceleration sensor, an angular velocity sensor, and a geomagnetic sensor, or may be a combination of these sensors. The sensor 110 outputs detection results indicating acceleration, angular velocity, and/or geomagnetism on at least two axes among the x, y, and z axes of an orthogonal coordinate system in which the mobile device in which the sensor 110 is mounted is the origin. The present embodiment describes an example in which the surface of the mobile device is in the xy plane, and the z axis is in a direction perpendicular to the xy plane.

The acquiring section 120 acquires an output signal of the sensor 110 mounted in the mobile device held by the user. For example, the acquiring section 120 is connected to a plurality of the sensors 110 and acquires output signals corresponding to the movement of the mobile device from the sensors 110. When the user walks while possessing the mobile device, the acquiring section 120 acquires from the sensor 110 the output signal corresponding to the movement of the mobile device that accompanies the walking of the user. The acquiring section 120 transmits the acquired signal to the hold state judging section 130, the walking judging section 140, and the change detecting section 160.

The hold state judging section 130 is connected to the acquiring section 120 and judges the hold state of the mobile device, based on a periodic change pattern of the output signal from the sensor 110. When the user walks while possessing the mobile device, the hold state judging section 130 judges the hold state of the mobile device based on the change pattern of the output signal that accompanies the walking of the user.

The description of the present embodiment focuses mainly on a case in which the hold state judging apparatus 100 includes a pattern storage section 150 that stores a plurality of hold states and reference characteristic amounts obtained by performing a prescribed computation on the output signals sampled in advance respectively for these hold states, in association with each other, and the hold state judging section 130 judges the hold state of the mobile device based on which reference characteristic amount stored in the pattern storage section 150 the characteristic amount obtained by performing a computation that is the same type as the prescribed computation on the output signal of the sensor 110 acquired by the acquiring section 120 corresponds to.

The hold state judging section 130 includes a calculating section 132 and a characteristic amount correspondence judging section 134.

The pattern storage section 150 stores information indicating a plurality of hold states of the mobile device and reference characteristic amounts of the output signal of the sensor 110 acquired in advance for each of the plurality of hold states, in association with each other. The reference characteristic amounts are characteristic amounts obtained by performing a prescribed computation on the output signal of the sensor 110 sampled in advance, and correspond to the plurality of axial direction components included in the output signal.

The pattern storage section 150 stores information indicating a characteristic of a pattern of the output signal, for each of the hold states of the mobile device. For example, the pattern storage section 150 stores a correspondence relationship between each hold state and a reference characteristic amount obtained from the average or the variance of the axial direction components included in the output signal sampled in advance for each of these hold states. The pattern storage section 150 stores, as the reference characteristic amounts, first to n-th principal components that are results obtained by performing a principal component analysis on the average and the variance of a plurality of axial direction components included in the output signal sampled in advance for each of the hold states.

The calculating section 132 receives the output signal of the sensor 110 and calculates the characteristic amount including at least one of the average and the variance for at least a portion of the plurality of axial direction components included in the output signal. Specifically, the average and the variance of the axial direction components included in the output signal are weighted with a prescribed weighting coefficient, and the characteristic amount is calculated as the first-order linear combination of these values. The weighting coefficient used here is preferably a result obtained by performing a principal component analysis on at least one of the average and the variance of a plurality of axial direction components included in the output signal sampled in advance for each of the hold states.

The characteristic amount correspondence judging section 134 judges the hold state of the mobile device according to the characteristic amount calculated by the calculating section 132 and the reference characteristic amount stored by the pattern storage section 150. As an example, the characteristic amount correspondence judging section 134 judges the hold state of the mobile device based on which range of a plurality of distribution grouped according to the hold states of the mobile device the characteristic amount calculated by the calculating section 132 is included in. The characteristic amount correspondence judging section 134 transmits the judgment results to the hold state estimating section 170.

The walking judging section 140 is connected to the acquiring section 120 and judges a walking state of a user holding the mobile device, according to the output signal of the sensor 110 received from the acquiring section 120. As an example, the walking judging section 140 judges whether the user is in the walking state. The walking judging section 140 is connected to the hold state judging section 130 and transmits the judgment results to the hold state judging section 130.

The change detecting section 160 is connected to the acquiring section 120 and detects change in the hold state of the mobile device based on the output signal of the sensor 110 received from the acquiring section 120. As an example, the change detecting section 160 detects change in the hold state of the mobile device in response to a characteristic of a pattern of the output signal changing to a different characteristic. In this case, the change detecting section 160 may be connected to the pattern storage section 150 and compare the characteristic of a pattern read from the pattern storage section 150 to the characteristic of the pattern of the output signal.

The hold state estimating section 170 is connected to the hold state judging section 130 and estimates the hold state of the mobile device of the user by referencing the judgment results of the hold state judging section 130 at a plurality of times. Furthermore, the hold state estimating section 170 is connected to the change detecting section 160 and references at least a portion of the judgment results of the hold state judging section 130 in a period during which the change detecting section 160 did not detect change in the hold state.

Specifically, in response to a time at which change in the hold state was detected by the change detecting section 160 being included in the period during which the hold state judging section 130 outputs a certain judgment result, the hold state estimating section 170 does not reference this certain judgment result. Furthermore, in response to a time at which change in the hold state was detected by the change detecting section 160 not being included in the period during which the hold state judging section 130 outputs a certain judgment result, the hold state estimating section 170 outputs this certain judgment result as an estimation result.

The hold state estimating section 170 estimates the hold state of the mobile device of the user by referencing the judgment results of the hold state judging section 130 at a plurality of times, for example. Furthermore, the hold state estimating section 170 estimates the hold state of the mobile device of the user based on the output of the change detecting section 160. For example, the hold state estimating section 170 estimates the hold state based on the output signals at times after a time at which the change detecting section 160 detects change in the hold state of the mobile device. Furthermore, the hold state estimating section 170 may estimate the hold state without substantially using information obtained from the output signal at a time before the change detecting section 160 detects a change in the hold state of the mobile device and/or information obtained from the output signal near a time at which the change detecting section 160 detects a change in the hold state of the mobile device.

The hold state judging apparatus 100 according to the present embodiment described above judges one hold state for the mobile device possessed by the user from among hold states of the mobile device classified in a plurality of predetermined categories. For example, the hold state judging section 130 includes, in the categories of hold states of the mobile device, a state in which the mobile device is held in the hand of the user while being manipulated or viewed, a state in which the mobile device is held in the hand of the user while the arm of the user is swinging, a state in which the mobile device is in a pocket, and a state in which the mobile device is in a bag. In other words, the hold state refers to how the user is holding mobile device, i.e. the method of possession and the means of possession. In other words, the hold state judging section 130 judges at least one state from among the categories of the hold states of the mobile device.

Figure 2:
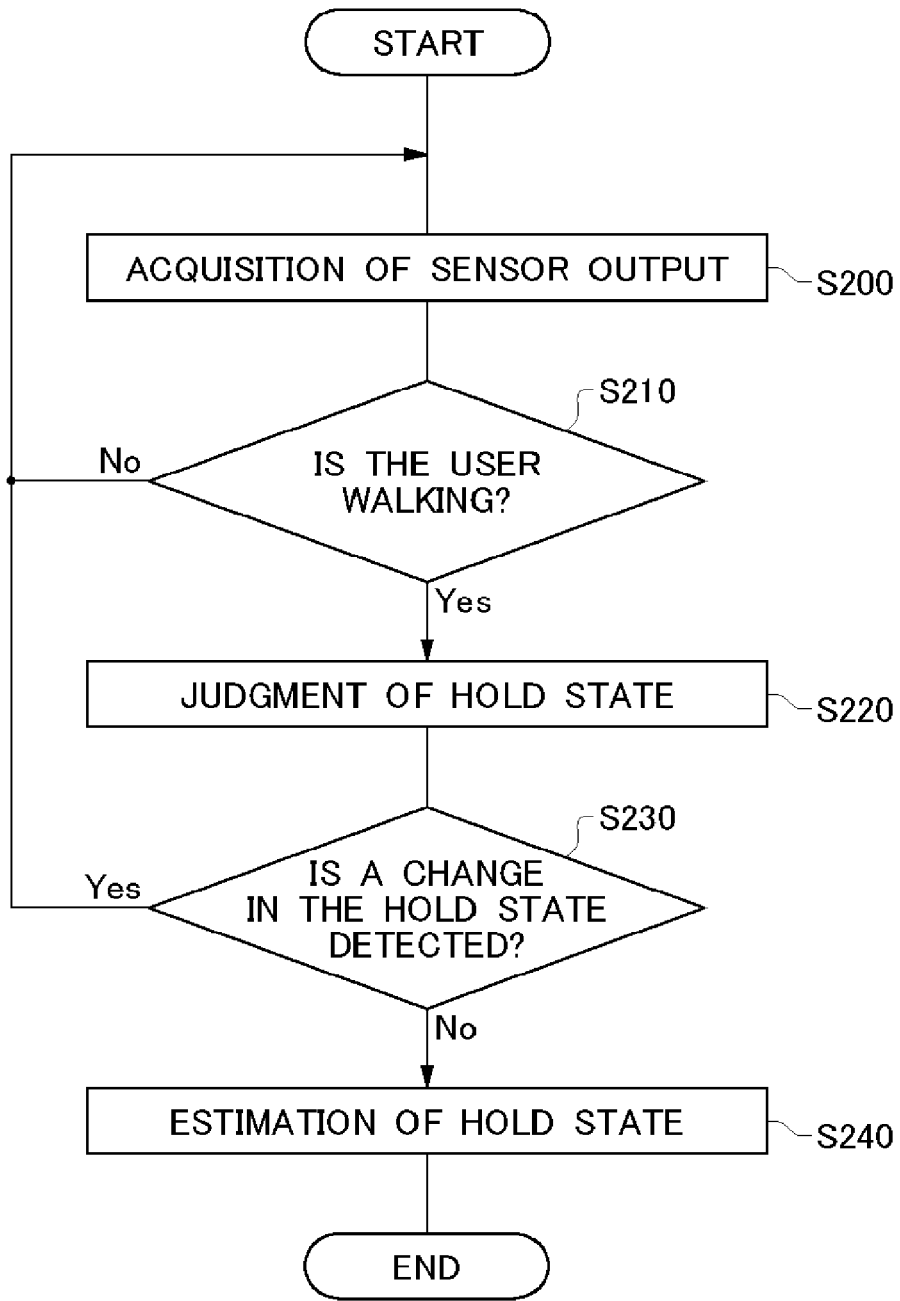
FIG. 2 shows an operational flow of the hold state judging apparatus 100 according to the present invention.

FIG. 2 shows an operational flow of the hold state judging apparatus 100 according to the present invention. The hold state judging apparatus 100 judges the hold state of the mobile device possessed by the user by performing the operational flow shown in FIG. 2.

Figure 3:
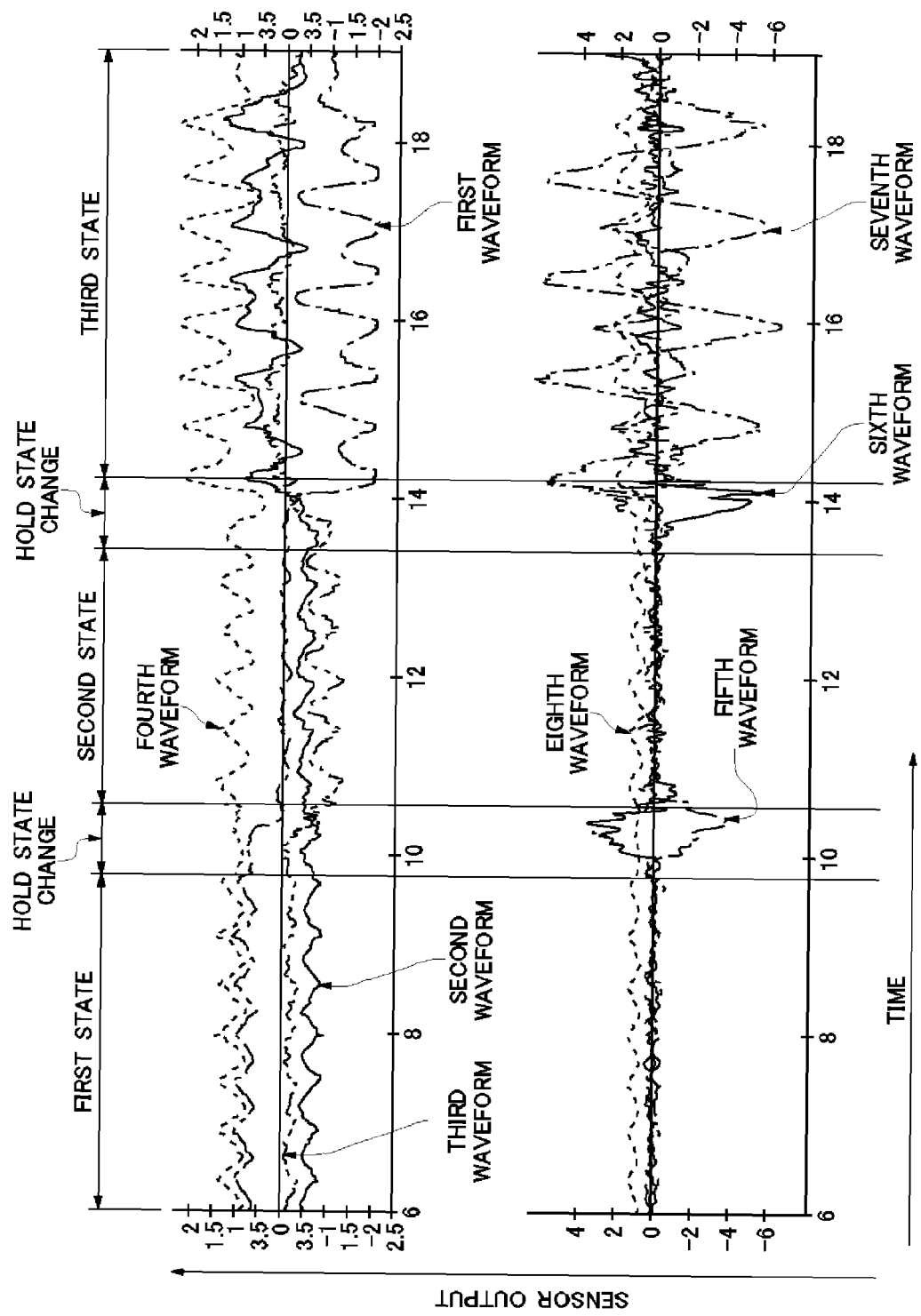
FIG. 3 shows exemplary output waveforms of the sensors 110 according to the present embodiment.

First, the acquiring section 120 acquires the output signals of a plurality of the sensors 110 (S200). The present embodiment describes an example in which the plurality of sensors 110 are a total of six sensors including acceleration sensors that detect acceleration in the orthogonal x, y, and z directions and angular velocity sensors that detect angular velocity in the x, y, and z directions. FIG. 3 shows exemplary output waveforms of the sensors 110 according to the present embodiment.

In FIG. 3, the horizontal axis indicates time and the vertical axis indicates the output intensity of each sensor. For example, the first, second, and third waveforms respectively indicate the output intensities of the acceleration sensors detecting the acceleration in the x, y, and z directions. Furthermore, the fourth waveform indicates a composite waveform including the first, second, and third waveforms. The fifth, sixth, and seventh waveforms respectively indicate the output intensities of the angular velocity sensors detecting the angular velocity in the x, y, and z directions. The eighth waveform is a composite waveform including the fifth, sixth, and seventh waveforms. The acquiring section 120 acquires waveforms such as the first, second, third, fifth, sixth, and seventh waveforms from the respective sensors 110, and transmits these waveforms to the hold state judging section 130, the walking judging section 140, and the change detecting section 160.

Next, the walking judging section 140 judges whether the user is walking (S210). For example, the walking judging section 140 judges whether the user is walking according to whether the output signals from the acceleration sensors fluctuate periodically within a predetermined range. When the user is walking with a substantially constant speed, acceleration in the progression direction of the user and acceleration in a direction orthogonal to the progression direction occur at substantially constant periods. In this case, acceleration occurs with a period and amplitude corresponding to the height, weight, leg length, gait, and walking speed of the user, for example, and the acceleration sensors output an oscillation pattern corresponding to the walking of the user by detecting these types of acceleration.

The walking judging section 140 judges whether the user is walking according to a characteristic of a pattern of an output signal, for example. In this case, the walking judging section 140 is connected to the pattern storage section 150 and may compare a characteristic of a pattern read from the pattern storage section 150 to the characteristic of the pattern of the output signal. In this case, the pattern storage section 150 may store in advance a pattern of the output signal occurring when the user is actually walking.

In the example of FIG. 3, the first and second waveforms, which are the output waveforms of the acceleration sensors detecting the acceleration in the x-axis direction and the y-axis direction of the mobile device, have output intensities that fluctuate at substantially constant periods during the intervals indicated by the first state and the third state. Furthermore, the second and third waveforms, which are the output waveforms of the acceleration sensors detecting the acceleration in the y-axis direction and the z-axis direction of the mobile device, have output intensities that fluctuate at substantially constant periods during the intervals indicated by the second state. The walking judging section 140 judges that the user is walking according to the detection of such fluctuation.

If the walking judging section 140 does not detect fluctuation at substantially constant periods such as this (S210: No), the hold state judging apparatus 100 moves to step S200 and returns to acquiring the output signal with the acquiring section 120. If the walking judging section 140 judges that the user is walking (S210: Yes), the hold state judging section 130 judges the hold state of the mobile device (S220). Specifically, the hold state judging section 130 judges the hold state of the mobile device on a condition that the user is judged to be walking.

Instead, the hold state judging section 130 may judge the hold state of the mobile device in parallel with the judgment operation performed by the walking judging section 140. In this case, the hold state judging section 130 sequentially performs the judgment for a predetermined interval of the output signal received from the acquiring section 120, and transmits to the hold state estimating section 170 the judgment result at a timing when a judgment result is received indicating that the walking judging section 140 judged the user to be walking. In other words, the hold state judging section 130 judges the hold state of the mobile device based on the output signal at a timing when the user is walking.

The pattern storage section 150 stores a plurality of hold states and reference characteristic amounts obtained by performing a prescribed computation on the output signal accompanying the walking of the user sampled in advance for each of the hold states, in association with each other.

The reference characteristic amount may be a characteristic amount including at least one of the average and the variance for at least a portion of the plurality of axial direction components included in the output signal.

As another example, in a case where the plurality of sensors 110 include a first sensor detecting a first physical amount and a second sensor detecting a second physical amount that is of a different type than the first physical amount, the reference characteristic amounts may be characteristic amounts corresponding to at least one axial direction component in the output signal of the first sensor and at least one axial direction component in the output signal of the second sensor, for example. In this way, by using reference characteristic amounts based on a plurality of physical amounts, it is possible to improve the accuracy of the hold state judgment and more specifically judge the hold state. Examples of the first sensor and the second sensor can include angular velocity sensors, acceleration sensors, geomagnetic sensors, and the like.

The prescribed computation is not particularly limited as long as it is a computation through which the reference characteristic amounts described above are obtained, and may be a computation that includes weighting the output signals of the plurality of sensors 110 with weighting coefficients obtained as the results of a principal component analyses performed on the output signals sampled in advance for each of the hold states.

Instead, the pattern storage section 150 may store the plurality of hold states and a relationship between two or more axial direction components from among the plurality of axial direction components obtained at a time when the output signal accompanying the direction of the user sampled in advance for each of the hold states is separated into the plurality of axial direction components.

As another example, in a case where the plurality of sensors 110 include a first sensor detecting a first physical amount and a second sensor detecting a second physical amount that is of a different type than the first physical amount, the pattern storage section 150 may store the relationship between at least one axial direction component of the output signal of the first sensor and at least one axial direction component of the output signal of the second sensor. In this way, by using a relationship based on a plurality of physical amounts, it is possible to improve the accuracy of the hold state judgment and more specifically judge the hold state. Examples of the first sensor and the second sensor can include angular velocity sensors, acceleration sensors, geomagnetic sensors, and the like.

The hold state judging section 130 judges the hold state of the mobile device based on the output signal of a sensor 110 acquired by the acquiring section 120 and the output of the pattern storage section 150. More specifically, the acquiring section 120 calculates a characteristic amount by performing, on the output signal of the sensor 110 acquired by the acquiring section 120, a computation that is the same type as the prescribed computation performed by the pattern storage section 150, and judges the hold state of the mobile device based on which reference characteristic amount stored in the pattern storage section 150 this calculated characteristic amount corresponds to.

The computation performed by the hold state judging section 130 may be a computation that includes weighting the output signals of the plurality of sensors 110 with weighting coefficients obtained as the results of a principal component analysis performed on the output signals sampled in advance for each of the hold states. It should be noted that it is not necessary to use the exact same coefficient as the weighting coefficient obtained as the result of the principal component analysis, and a slight adjustment coefficient that changes the coefficient by a small amount, for example, may be added to the coefficient.

Instead, the hold state judging section 130 may judge the hold state of the mobile device based on the relationship between two or more axial direction components among the plurality of axial direction components when the output signal of the sensor 110 accompanying the walking of the user is separated into the plurality of axial direction components.

As another example, in a case where the plurality of sensors 110 include a first sensor detecting a first physical amount and a second sensor detecting a second physical amount that is of a different type than the first physical amount, the hold state judging section 130 may judge the hold state of the mobile device based on the relationship between at least one axial direction component of the output signal of the first sensor and at least one axial direction component of the output signal of the second sensor. In this way, by using a relationship based on a plurality of physical amounts, it is possible to improve the accuracy of the hold state judgment and more specifically judge the hold state.

Examples of the first sensor and the second sensor can include angular velocity sensors, acceleration sensors, geomagnetic sensors, and the like. As another example, the hold state judging section 130 judges the category of a hold state of the mobile device based on change patterns of the plurality of axial direction components of the output signal. Here, the hold state judging section 130 judges the hold state of the mobile device according to the waveform pattern in a predetermined interval of the output signal, for example.

For example, the hold state judging section 130 sets the predetermined interval Δt to be n times a fluctuation period of the output signal that is to be detected for the walking of the user, where n is an integer greater than or equal to 1. Instead, the hold state judging section 130 may set the interval to be approximately n times an average value of each fluctuation period detected for the walking of a plurality of users.

The hold state judging section 130 judges the hold state of the mobile device based on the relationship between two or more axial direction components from among the plurality of axial direction components of acceleration and/or angular velocity detected by the sensors 110. For example, in the first state of FIG. 3, the hold state judging section 130 judges the hold state of the mobile device according to the first waveform and second waveform having output intensities that fluctuate with a substantially constant period, the fluctuation of the third waveform being less than the fluctuation of the first waveform and the second waveform, or fluctuation of the fifth, sixth, and seventh waveforms that are the angular velocity detection results not being detected. In this case, the hold state judging section 130 judges that the x-axis direction and the y-axis direction of the mobile device corresponding to the first waveform and the second waveform are substantially parallel to the progression direction of the user and the vertical direction that is the upright direction of the user, respectively, and judges that the user is holding the mobile device up to the ear.

Furthermore, in the second state of FIG. 3, the hold state judging section 130 may judge the hold state of the mobile device according to the second waveform and the third waveform having output intensities that fluctuate at substantially constant intervals, the fluctuation of the first waveform being less than the second waveform and the third waveform, or fluctuation of the fifth, sixth, and seventh waveforms not being detected. In this case, the hold state judging section 130 judges that the y-axis direction and the z-axis direction of the mobile device are substantially parallel to the progression direction of the user and the vertical direction that is the upright direction of the user, respectively, and judge that the user is holding the mobile device in the hand while viewing the display screen.

In the third state of FIG. 3, the hold state judging section 130 judges the hold state of the mobile device according to the first waveform and second waveform having output intensities that fluctuate with a substantially constant period, the fluctuation of the third waveform being less than the fluctuation of the first waveform and the second waveform, or the seventh waveform having an output intensity that fluctuates at a substantially constant period. In this case, the hold state judging section 130 judges that the x-axis direction and the y-axis direction of the mobile device are respectively substantially parallel to the progression direction of the user and the vertical direction that is the upright direction of the user and that angular velocity is being added to the x-axis direction with a constant period, and judges that the user is holding the mobile device in the hand while swinging the arm.

In this way, the hold state judging section 130 may judge the hold state of the mobile device based on the change pattern of a plurality of components that include at least one axial direction component of a first output signal from the first sensor that detects the first physical amount for at least one axial direction and at least one axial direction component of a second output signal from the second sensor that detects the second physical amount differing from the first physical amount for at least one axial direction. Furthermore, the hold state judging section 130 may judge the hold state based on the detection results of three or more types of physical amounts. In this way, by judging the hold state based on a plurality of physical amounts, the hold state judging section 130 can judge the hold state of a more complex mobile device.

The hold state judging section 130 judges the hold state of the mobile device according to the patterns of the output signals of the plurality of sensors 110. Here, the hold state judging section 130 may judge which of a plurality of hold states an output signal corresponds to, based on information stored in the pattern storage section 150. In this case, for example, the pattern storage section 150 stores the patterns of output signals corresponding to hold states of the mobile device, and the hold state judging section 130 compares the pattern of the output signal to the stored patterns and, in response to finding a matching pattern, sets the corresponding hold state as the judgment result. In this way, it is possible to judge various hold states.

Instead, the hold state judging section 130 may judge the hold state of the mobile device based on which reference characteristic amount stored in the pattern storage section 150 the characteristic amount acquired from the output signal corresponds to. Specifically, the pattern storage section 150 stores a result obtained by performing a principal component analysis on an average value, variance, fluctuation amplitude, or period of the output signal corresponding to the hold state of the mobile device as a reference characteristic amount, for example. In this case, the characteristic amount correspondence judging section 134 compares the characteristic amount calculated by the calculating section 132 to the reference characteristic amounts of the stored patterns and, in response to the characteristic amount matching a reference characteristic amount within a predetermined range, sets the corresponding hold state as the judgment result. At predetermined intervals Δt, the characteristic amount correspondence judging section 134 judges the hold state of the mobile device and transmits the judgment result to the hold state estimating section 170.

The output signal from a sensor that accompanies walking movement of the user is significantly different for each hold state of the mobile device. Using this fact, the hold state judging section 130 may judge the hold state of the mobile device based on the output signal at a timing during walking of the user, from among the output signals of the sensors 110 acquired by the acquiring section 120, or may judge the hold state of the mobile device without substantially using the output signals at timing when the user is not walking, from among the output signals of the sensors 110 acquired by the acquiring section 120.

By using an output signal of a sensor during walking of the user, it is possible to improve the accuracy of the hold state judgment and to more specifically judge the hold state. Here, the phrase "without substantially using the output signals at timing when the user is not walking" includes, in addition to a case of not using output signals at a timing when the user is not walking, a case of using these output signals while significantly reducing the effect and impact of these output signals.

Next, the hold state estimating section 170 sequentially receives the detection results of the change detecting section 160 and, for each judgment result of the hold state judging section 130, checks whether a change in the hold state has been detected during the interval Δt during which the judgment was made (S230). If a change in the hold state has been detected during the judgment interval Δt (S230: Yes), the hold state estimating section 170 does not output the judgment result received from the hold state judging section 130, and the hold state judging apparatus 100 moves to step S200 and returns to acquiring the output signal using the acquiring section 120.

If a change in the hold state has not been detected during the judgment interval Δt (S230: No), the hold state estimating section 170 outputs the judgment result received from the hold state judging section 130 as the estimation result of the hold state (S240). In other words, if the hold state of the mobile device has changed, the hold state estimating section 170 deletes the judgment result based on the output signal output around or at the time of the change of the hold state. In this way, the hold state estimating section 170 can delete incorrect judgment results of the hold state judging section 130 generated in response to a change in the hold state.

As an example, the change detecting section 160 detects a change in the hold state of the mobile device in response to the output signal of a sensor 110 being skewed from the periodic change pattern. For example, in FIG. 3, the change detecting section 160 detects that the hold state has changed in response to receiving the output signal for the interval during which the change from the first state to the second state occurs. Furthermore, the change detecting section 160 detects that the hold state has changed in response to receiving the output signal for the interval during which the change from the second state to the third state occurs. The change detecting section 160 detects the change of the hold state of the mobile device based on the output signal from an acceleration sensor, an angular velocity sensor, and/or a geomagnetic sensor, for example.

In this way, the change detecting section 160 detects the change of the hold state of the mobile device independently from the judgment made by the hold state judging section 130. The change detecting section 160 detects whether the hold state has changed, and therefore it is possible to perform the detection in a time that is shorter than the interval during which the hold state is specifically judged.

Accordingly, the hold state estimating section 170 can estimate the judgment result of the mobile device during a judgment interval Δt according to whether one or more changes in the hold state have been detected among two or more detection results of the change of the hold state received during this judgment interval. In other words, the hold state estimating section 170 can judge the possibility of an incorrect judgment by the hold state judging section 130, due to the detection result of the change of the hold state having a higher time resolution than the hold state judgment interval, and can therefore accurately remove incorrect judgment results.

The hold state judging apparatus 100 outputs the estimation result of the hold state judging section 130 as the judgment result. With the hold state judging apparatus 100 according to the present embodiment described above, change of the pattern of an output signal caused by walking of the user is detected in a plurality of axial direction components caused by the hold state of the mobile device, and the hold state of the mobile device is judged. Accordingly, it is possible to isolate the signal detected in response to movement of the user possessing the mobile device from the signal detected according to fluctuation of the hold state of the mobile device.

The hold state judging apparatus 100 detects the change of the pattern of an output signal having a plurality of axial direction components and/or change of the pattern of an output signal having a plurality of axial direction components relative to a plurality of physical amounts, and can therefore accurately judge a variety of hold states of the mobile device. The hold state judging apparatus 100 does not output the judgment results if the user is not walking or if the hold state is changed, and can therefore eliminate incorrect judgment results for the hold state.

The above describes an example in which the hold state judging apparatus 100 according to the present embodiment sequentially performs the acquisition of the sensor output, the judgment of the walking state of the user, the judgment of the hold state of the mobile device, the detection of the change of the hold state of the mobile device, and the like according to the flow shown in FIG. 2. Instead, the hold state judging apparatus 100 may perform these operations in parallel in units of the predetermined interval Δt, and the hold state judging section 130 may output the judgment results continuously at every interval Δt.

The hold state judging section 130 may, at each of the plurality of continuous intervals Δt, judge hold state candidates of the mobile device based on the output signals of the sensors 110 and select the hold state candidate that occurs most among the hold state candidates in the plurality of intervals Δt to be the hold state of the mobile device. In this way, the hold state judging section 130 can more accurately judge the hold state of the mobile device.

Figure 4:
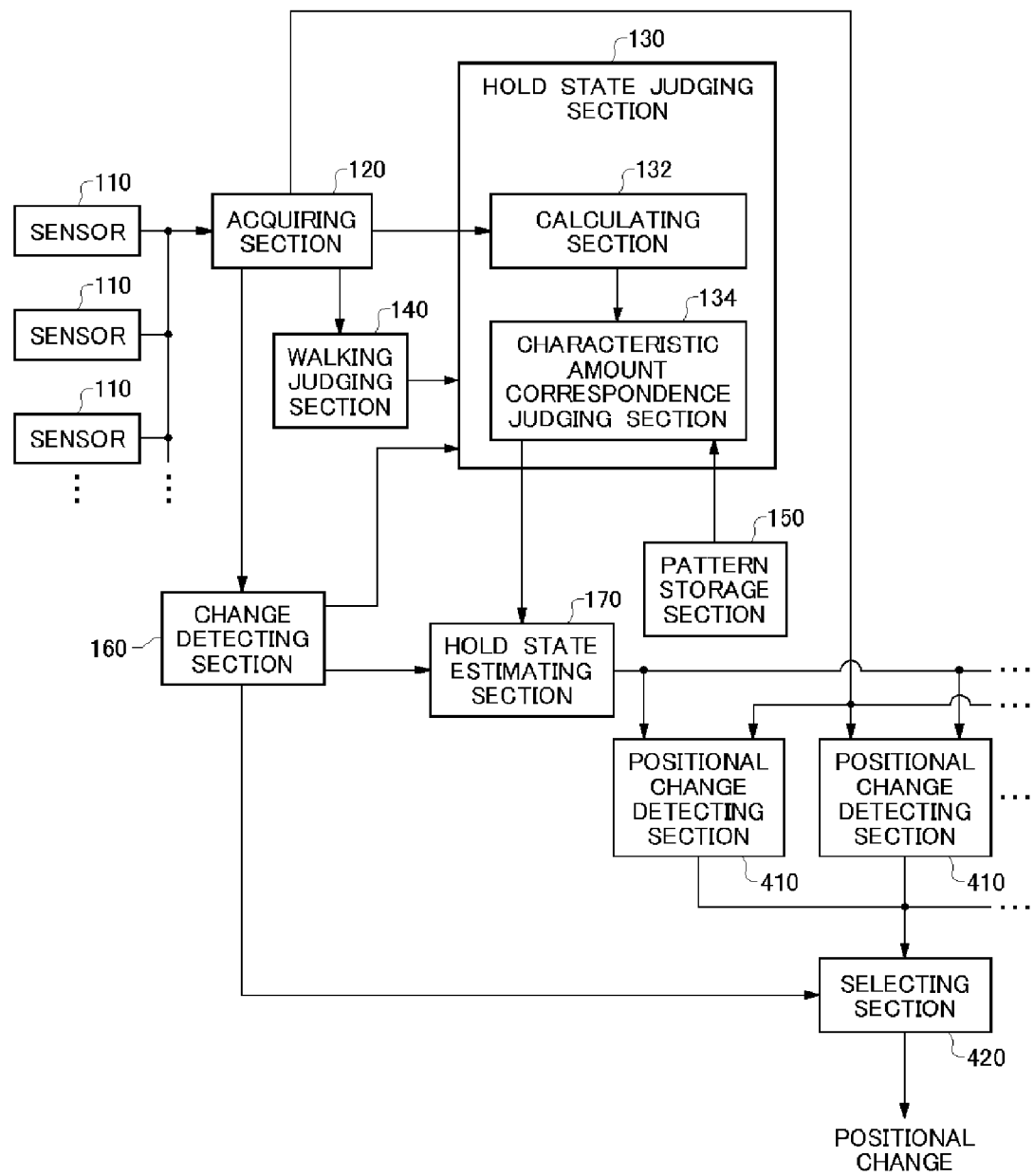
FIG. 4 shows an exemplary modification of the hold state judging apparatus 100 according to the present embodiment.

FIG. 4 shows an exemplary modification of the hold state judging apparatus 100 according to the present embodiment. In the hold state judging apparatus 400 according to the present modification, components that perform substantially the same operation as components in the hold state judging apparatus 100 of the present embodiment shown in FIG. 1 are given the same reference numerals, and descriptions thereof are omitted. The hold state judging apparatus 400 according to the present modification outputs change in position caused by walking of the user, based on the judgment results of the hold state judging apparatus 100 shown in FIG. 1. The hold state judging apparatus 400 further includes a plurality of positional change detecting sections 410 and a selecting section 420.

The change detecting section 160 transmits the detection results to the hold state judging section 130 as well as the hold state estimating section 170. In this case, the hold state judging section 130 judges the hold state of the mobile device of the user based on the output of the change detecting section 160. For example, the hold state judging section 130 judges the hold state based on the output signals after the time at which the change detecting section 160 detects a change in the hold state of the mobile device. Furthermore, the hold state judging section 130 may judge the hold state without substantially using information obtained from the output signals prior to the time at which the change detecting section 160 detects a change in the hold state of the mobile device and/or information obtained from the output signals near the time at which the change detecting section 160 detects a change in the hold state of the mobile device.

As an example, the hold state judging sections 130 include a first hold state judging section that judges the hold state of the mobile device of the user by performing a prescribed computation on the output signal of a sensor 110, a second hold state judging section that judges the hold state of the mobile device of the user by performing a computation that is different from the prescribed computation on the output signal of a sensor 110, and a hold state judgment selecting section that selects which hold state judging section result is to be substantially used from among the first hold state judging section and the second hold state judging section based on the output of the change detecting section 160. In this case, the sensors include an angular velocity sensor and a geomagnetic sensor, the first hold state judging section judges the hold state of the mobile device of the user based on the output signal of the angular velocity sensor, and the second hold state judging section judges the hold state of the mobile device of the user based on the output signal of the geomagnetic sensor.

The change detecting section 160 detects a change in the hold state in a shorter time than the time needed for the hold state judging section 130 to judge the hold state of the mobile device.

Each positional change detecting section 410 receives the output from the acquiring section 120 and the hold state estimating section 170 and detects positional change of the user according to a respective hold state of the mobile device. For example, one positional change detecting section 410 among the plurality of positional change detecting sections 410 is provided corresponding to the hold state in which the user holds the mobile device in the hand and manipulates or views the mobile device, and this one positional change detecting section 410 detects position change of the user for this hold state.

If the user moves while holding the mobile device in the hand, the substantially constant period of the output signal of the sensor 110 corresponds to the movement resulting from the walking of the user. Specifically, the position of the user changes by a distance corresponding to the step length of the user, in response to the output signal fluctuation for one period. Accordingly, this one positional change detecting section 410 outputs a positional change of the user corresponding to the step length of the user and the fluctuation of the output signal.

This one positional change detecting section 410 may use the output signal of the sensor that detects the angular velocity parallel to the movement direction of the user, or may instead use the output signal of the sensor that detects the angular velocity in the vertical direction of the user. Furthermore, information concerning the step length and the like of the user may be stored in the pattern storage section 150 in advance, and in this case, the positional change detecting section 410 may be connected to the pattern storage section 150 and read the information concerning the stop length and the like of the user.

In the same manner, the positional change detecting sections 410 are provided to respectively correspond to hold states such as a hold state in which the mobile device is held in the hand while the arm is swinging, the hold state in which the mobile device is in the pocket, and the hold state in which the mobile device is in a bag, and detect the positional change of the user in the respective hold states. In this way, according to the hold state of the user, even when there is a change in the substantially constant fluctuation period of an output signal caused by walking, it is possible to detect the positional change of the user corresponding to this change in each hold state.

The selecting section 420 is connected to the change detecting section 160 and selects one positional change detecting section 410 from among the plurality of positional change detecting sections 410 according to the output of the change detecting section 160. Specifically, since there is a high possibility of error for a hold state judgment result obtained during a change of the hold state, when the change detecting section 160 detects a change in the hold state, the selecting section 420 selects a positional change detecting section 410 that detects the positional change using a method that is not significantly affected by the hold state or that detects the positional change without using the estimation result of the hold state.

In this way, the positional change of the user can be correctly detected.

Figure 5:
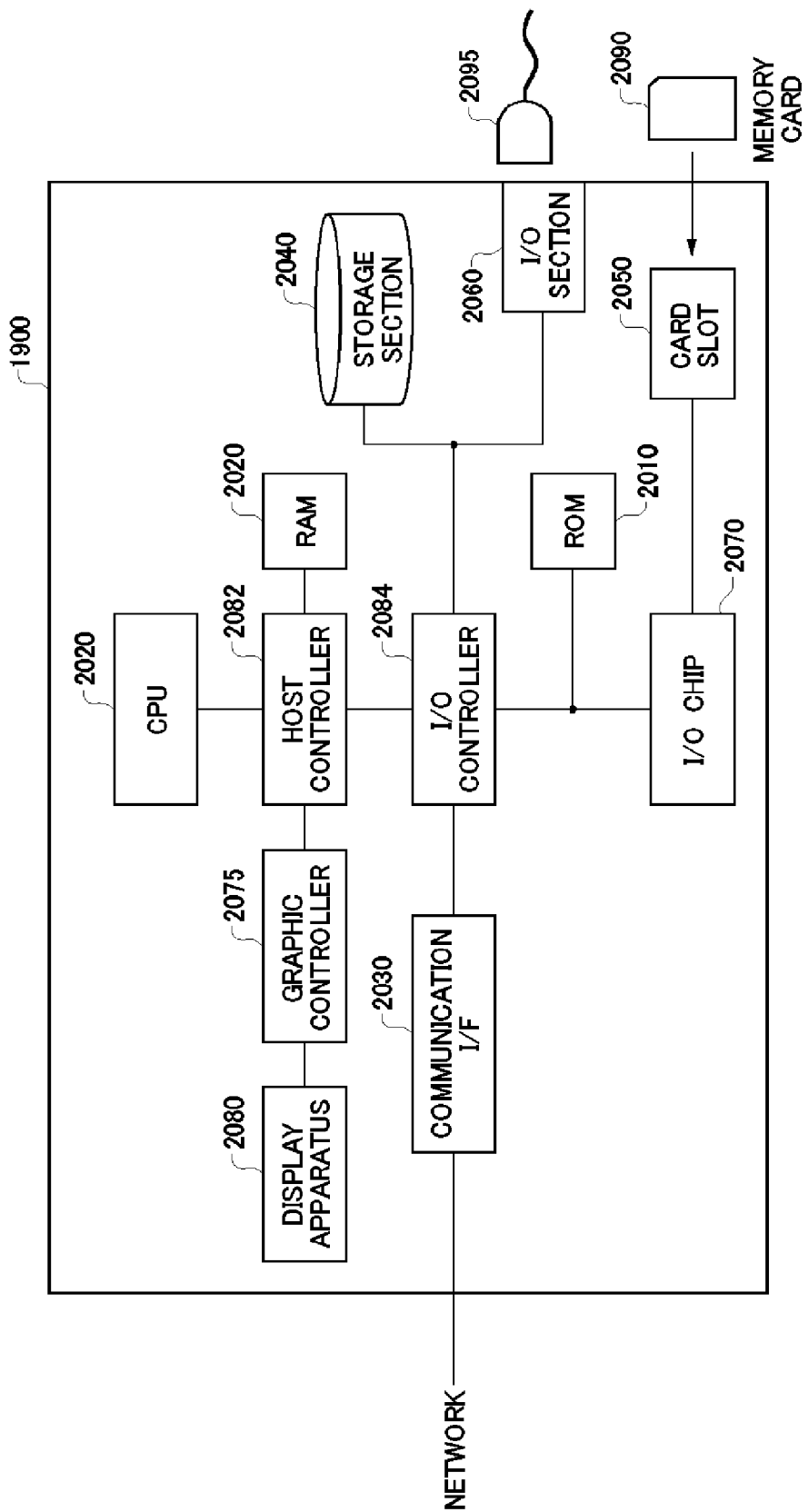
FIG. 5 shows an example of a hardware configuration of a computer 1900 according to the present embodiment.

FIG. 5 shows an example of a hardware configuration of a computer 1900 according to the present embodiment. The computer 1900 according to the present embodiment is mounted in the mobile device, for example. Instead, the computer 1900 may be provided outside the mobile device, receive output from a sensor of the mobile device, and transmit a judgment result and/or positional change to the mobile device. In this case, the computer 1900 may communicate wirelessly with the mobile device, for example.

The computer 1900 is provided with a CPU peripheral including a CPU 2000, a RAM 2020, a graphic controller 2075, and a display apparatus 2080, all of which are connected to each other by a host controller 208; a communication interface 2030, a storage section 2040, and an input/output section 2060, all of which are connected to the host controller 2082 by an input/output controller 2084; a ROM 2010; a card slot 2050; and an input/output chip 2070.

The host controller 2082 is connected to the RAM 2020 and is also connected to the CPU 2000 and graphic controller 2075 accessing the RAM 2020 at a high transfer rate. The CPU 2000 operates to control each section based on programs stored in the ROM 2010 and the RAM 2020. The graphic controller 2075 acquires image data generated by the CPU 2000 or the like on a frame buffer disposed inside the RAM 2020 and displays the image data in the display apparatus 2080. Instead, the graphic controller 2075 may internally include the frame buffer storing the image data generated by the CPU 2000 or the like.

The input/output controller 2084 connects the communication interface 2030 serving as a relatively high speed input/output apparatus, and the storage section 2040, and the Input/output section 2060 to the host controller 2082. The communication interface 2030 communicates with other apparatuses via a network. The storage section 2040 stores the programs and data used by the CPU 2000 housed in the computer 1900. The storage section 2040 is a non-volatile memory and may be a flash memory or hard disk, for example.

The Input/output section 2060 is connected to the connector 2095, sends and receives programs or data to and from the outside, and provides the programs or data to the storage section 2040 via the RAM 2020. The input/output section 2060 may communicate with the outside using a standardized connector and communication method, and in this case the input/output section 2060 may use a standard such as USB, IEEE 1394, HDMI (Registered Trademark), or Thunderbolt (Registered Trademark). The input/output section 2060 may communicate with the outside used a wireless communication standard such as Bluetooth (Registered Trademark).

Furthermore, the input/output controller 2084 is connected to the ROM 2010, and is also connected to the card slot 2050 and the input/output chip 2070 serving as a relatively high speed input/output apparatus. The ROM 2010 stores a boot program performed when the computer 1900 starts up, a program relying on the hardware of the computer 1900, and the like. The card slot 2050 reads programs or data from a memory card 2090 and supplies the read information to the storage section 2040 via the RAM 2020. The input/output chip 2070 connects the card slot 2050 to the input/output controller 2084 along with each of the input/output apparatuses via, a parallel port, a serial port, a keyboard port, a mouse port, or the like.

The programs provided to the storage section 2040 via the RAM 2020 are provided by a user through the input/output section 2060 or by being stored in a storage medium, such as the memory card 2090. The programs are read from storage medium, installed in the storage section 2040 inside the computer 1900 via the RAM 2020, and performed by the CPU 2000.

The programs are installed in the computer 1900 and cause the computer 1900 to function as the acquiring section 120, the hold state judging section 130, the walking judging section 140, the pattern storage section 150, the change detecting section 160, and the hold state estimating section 170. In addition, the programs may cause the computer 1900 to function as the positional change detecting sections 410 and the selecting section 420.

The information processes recorded in the programs are read by the computer 1900 to cause the computer 1900 to function as software and hardware described above, which are exemplified by the specific sections of the acquiring section 120, the hold state judging section 130, the walking judging section 140, the pattern storage section 150, the change detecting section 160, the hold state estimating section 170, the positional change detecting sections 410, and the selecting section 420. With these specific sections, a unique hold state judging apparatus 100 or hold state judging apparatus 400 suitable for an intended use can be configured by realizing the calculations or computations appropriate for the intended use of the computer 1900 of the present embodiment.

For example, if there is communication between the computer 1900 and an external apparatus or the like, the CPU 2000 performs the communication program loaded in the RAM 2020, and provides the communication interface 2030 with communication processing instructions based on the content of the process recorded in the communication program. The communication interface 2030 is controlled by the CPU 2000 to read the transmission data stored in the RAM 2020, the storage section 2040, the memory card 2090, or a transmission buffer region provided to a storage apparatus or the like connected via the input/output section 2060, and send this transmission data to the network, and to write data received from the network onto a reception buffer area on the storage apparatus. In this way, the communication interface 2030 may transmit data to and from the storage apparatus through DMA (Direct Memory Access). As another possibility, the CPU 2000 may transmit the data by reading the data from the storage apparatus or communication interface 2030 that are the origins of the transmitted data, and writing the data onto the communication interface 2030 or the storage apparatus that are the transmission destinations.

The CPU 2000 may perform various processes on the data in the RAM 2020 by reading into the RAM 2020, through DMA transmission or the like, all or a necessary portion of the database or files stored in the external apparatus such as the storage section 2040, the input/output section 2060, or the memory card 2090. The CPU 2000 writes the processed data back to the external apparatus through DMA transmission or the like. In this process, the RAM 2020 is considered to be a section that temporarily stores the content of the external storage apparatus, and therefore the RAM 2020, the external apparatus, and the like in the present embodiment are referred to as a memory, a storage section, and a storage apparatus. The variety of information in the present embodiment, such as the variety of programs, data, tables, databases, and the like are stored on the storage apparatus to become the target of the information processing. The CPU 2000 can hold a portion of the RAM 2020 in a cache memory and read from or write to the cache memory. With such a configuration as well, the cache memory serves part of the function of the RAM 2020, and therefore the cache memory is also included with the RAM 2020, the memory, and/or the storage apparatus in the present invention, except when a distinction is made.

The CPU 2000 executes the various processes such as the computation, information processing, condition judgment, searching for/replacing information, and the like included in the present embodiment for the data read from the RAM 2020, as designated by the command sequence of the program, and writes the result back onto the RAM 2020. For example, when performing condition judgment, the CPU 2000 judges whether a variable of any type shown in the present embodiment fulfills a condition of being greater than, less than, no greater than, no less than, or equal to another variable or constant. If the condition is fulfilled, or unfulfilled, depending on the circumstances, the CPU 2000 branches into a different command sequence or acquires a subroutine.

The CPU 2000 can search for information stored in a file in the storage apparatus, the database, and the like. For example, if a plurality of entries associated respectively with a first type of value and a second type of value are stored in the storage apparatus, the CPU 2000 can search for entries fulfilling a condition designated by the first type of value from among the plurality of entries stored in the storage apparatus. The CPU 2000 can then obtain the second type of value associated with the first type of value fulfilling the prescribed condition by reading the second type of value stored at the same entry.

The programs and modules shown above may also be stored in an external storage medium. The memory card 2090, an optical storage medium such as a DVD, Blu-ray (Registered Trademark), or CD, a magneto-optical storage medium, a tape medium, a semiconductor memory such as an IC card, or the like can be used as the storage medium. Furthermore, a storage apparatus such as a hard disk or RAM that is provided with a server system connected to the Internet or a specialized communication network may be used to provide the programs to the computer 1900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A hold state judging apparatus comprising:
    an acquiring section that acquires output signals of an angular velocity sensor and an acceleration sensor mounted in a mobile device held by a user;
    a pattern storage section that stores, in association with each other, information indicating a plurality of hold states of the mobile device and reference characteristic amounts of the output signals of the angular velocity sensor and the acceleration sensor obtained in advance respectively for the plurality of hold states;
    a hold state judging section that judges the hold state of the mobile device based on which of the reference characteristic amounts stored in the pattern storage section characteristic amounts of the output signals of the angular velocity sensor and the acceleration sensor acquired by the acquiring section correspond to;
    a plurality of positional change detecting sections that are provided to correspond respectively to the plurality of hold states of the mobile device and each detect positional change of the user; and
    a selecting section that selects, as the positional change of the user, the positional change output by the positional change detecting section corresponding to the hold state judged by the hold state judging section from among the hold states of the mobile device, wherein
    at least one positional change detecting section among the plurality of positional change detecting sections outputs the positional change of the user corresponding to a step length of the user and fluctuation of the output signals of the angular velocity sensor and the acceleration sensor.

2. The hold state judging apparatus according to claim 1, wherein
    the reference characteristic amounts are characteristic amounts that are obtained by performing a prescribed computation on the output signals of the angular velocity sensor and the acceleration sensor sampled in advance and correspond to a plurality of axial direction components included in the output signals, and
    the hold state judging section judges the hold state of the mobile device based on which of the reference characteristic amounts the characteristic amounts obtained by performing a computation that is the same type as the prescribed computation on the output signals of the angular velocity sensor and the acceleration sensor acquired by the acquiring section correspond to.

3. The hold state judging apparatus according to claim 2, wherein the reference characteristic amounts are characteristic amounts that include at least one of an average and a variance for at least a portion of the plurality of axial direction components included in the output signals sampled in advance.

4. The hold state judging apparatus according to claim 2, wherein the reference characteristic amounts are reference amounts acquired as results obtained by performing a principal component analysis on the output signals sampled in advance, and the prescribed computation is a computation of weighting the output signals of the angular velocity sensor and the acceleration sensor acquired by the acquiring section with a weighting coefficient acquired as a result of the principal component analysis.

5. The hold state judging apparatus according to claim 4, wherein the reference characteristic amounts are characteristic amounts corresponding to at least one axial direction component in the output signal of the angular velocity sensor and at least one axial direction component in the output signal of the acceleration sensor.

6. The hold state judging apparatus according to claim 1, wherein the reference characteristic amounts are characteristic amounts obtained from the output signals corresponding to movement of the mobile device.

7. The hold state judging apparatus according to claim 1, wherein the reference characteristic amounts are characteristic amounts obtained from the output signals while the user is walking.

8. A hold state judging apparatus comprising:

an acquiring section that acquires output signals of an angular velocity sensor and an acceleration sensor mounted in a mobile device held by a user;

a hold state judging section that judges a hold state of the mobile device based on a relationship between two or more axial direction components among a plurality of axial direction components obtained when the output signals of the angular velocity sensor and the acceleration sensor are separated into the plurality of axial direction components;

a plurality of positional change detecting sections that are provided to correspond respectively to the plurality of hold states of the mobile device and each detect positional change of the user; and a selecting section that selects, as the positional change of the user, the positional change output by the positional change detecting section corresponding to the hold state judged by the hold state judging section from among the hold states of the mobile device, wherein at least one positional change detecting section among the plurality of positional change detecting sections outputs the positional change of the user corresponding to a step length of the user and fluctuation of the output signals of the angular velocity sensor and the acceleration sensor.

9. The hold state judging apparatus according to claim 8, wherein the hold state judging section judges the hold state of the mobile device based on the relationship between two or more axial direction components among a plurality of axial direction components obtained when the output signals of the angular velocity sensor and the acceleration sensor accompanying walking of the user are separated into the plurality of axial direction components.

10. The hold state judging apparatus according to claim 9, wherein the hold state judging section judges the hold state of the mobile device based on a relationship between at least one axial direction component of the output signal of the angular velocity sensor and at least one axial direction component of the output signal of the acceleration sensor.

11. The hold state judging apparatus according to claim 8, wherein the hold state judging section judges the hold state of the mobile device based on a relationship between a change pattern of one axial direction component among the plurality of axial direction components and a change pattern of another axial direction component that is different from the one axial direction component.

12. The hold state judging apparatus according to claim 11, wherein the change pattern is a periodic change pattern occurring in conjunction with walking of the user.

13. The hold state judging apparatus according to claim 8, further comprising:

a pattern storage section that stores a plurality of hold states and a relationship between two or more axial direction components among a plurality of axial direction components obtained when output signals sampled in advance for each of the plurality of hold states are separated into the plurality of axial direction components, wherein the hold state judging section judges the hold state of the mobile device based on the output signals of the angular velocity sensor and the acceleration sensor acquired by the acquiring section and the output of the pattern storage section.

14. The hold state judging apparatus according to claim 13, wherein the pattern storage section stores a relationship between two or more axial direction components among a plurality of axial direction components obtained when output signals accompanying walking of the user that are sampled in advance for each of the plurality of hold states are separated into the plurality of axial direction components.

15. The hold state judging apparatus according to claim 13, wherein the pattern storage section stores each hold state and a relationship between at least one axial direction component of the output signal of the angular velocity sensor sampled in advance for each hold state and at least one axial direction component of the output signal of the acceleration sensor.

16. A hold state judging apparatus comprising:

an acquiring section that acquires output signals of an angular velocity sensor and an acceleration sensor mounted in a mobile device held by a user;

a hold state judging section that judges a hold state of the mobile device based on the output signals accompanying walking of the user;

a plurality of positional change detecting sections that are provided to correspond respectively to the plurality of hold states of the mobile device and each detect positional change of the user; and a selecting section that selects, as the positional change of the user, the positional change output by the positional change detecting section corresponding to the hold state judged by the hold state judging section from among the hold states of the mobile device, wherein at least one positional change detecting section among the plurality of positional change detecting sections outputs the positional change of the user corresponding to a step length of the user and fluctuation of the output signals of the angular velocity sensor and the acceleration sensor.

17. The hold state judging apparatus according to claim 1, further comprising:
a walking judging section that judges a walking state of the user holding the mobile device.

18. The hold state judging apparatus according to claim 1, wherein
the hold state judging section judges the hold state of the mobile device on a condition that the user is judged to be walking.

19. The hold state judging apparatus according to claim 1, wherein
the hold state judging section judges the hold state of the mobile device based on the output signals at a timing when the user is walking, from among the output signals of the angular velocity sensor and the acceleration sensor acquired by the acquiring section.

20. The hold state judging apparatus according to claim 1, wherein
the hold state judging section judges the hold state of the mobile device without substantially using the output signals at a timing when the user is not walking, from among the output signals of the angular velocity sensor and the acceleration sensor acquired by the acquiring section.

21. The hold state judging apparatus according to claim 1, wherein
the hold state judging section judges the hold state of the mobile device to be at least one state from among a state in which the mobile device is held in a hand of the user while the user manipulates or views the mobile device, a state in which the mobile device is held in the hand while the user swings an arm, a state in which the mobile device is in a pocket, and a state in which the mobile device is in a bag.

22. The hold state judging apparatus according to claim 1, wherein the hold state judging section:
for each of a plurality of continuous intervals, judges candidates for the hold state of the mobile device based on the output signals, and
selects, as the hold state of the mobile device, the hold state candidate that occurs most from among the hold state candidates in the plurality of intervals.

23. The hold state judging apparatus according to claim 1, further comprising:
a hold state estimating section that estimates the hold state of the mobile device of the user by referencing the judgment results of the hold state judging section at a plurality of times.

24. The hold state judging apparatus according to claim 23, further comprising:
a change detecting section that detects a change in the hold state of the mobile device, wherein
the hold state estimating section references at least a portion of the judgment results of the hold state judging section during an interval in which the change detecting section did not detect a change in the hold state.

25. The hold state judging apparatus according to claim 1, further comprising:
a change detecting section that detects a change in the hold state of the mobile device.

26. A non-transitory computer readable medium storing thereon a program that causes a computer to function as the hold state judging apparatus according to claim 1.

* * * * *